United States Patent
Tate, Jr. et al.

(10) Patent No.: US 8,170,737 B2
(45) Date of Patent: May 1, 2012

(54) METHOD OF CONTROLLING VEHICLE POWERTRAIN AND VEHICLE CONTROL SYSTEM

(75) Inventors: Edward D. Tate, Jr., Grand Blanc, MI (US); Charles A. Massoll, Milford, MI (US); Anthony L. Posawatz, Davisburg, MI (US); John R. Ferris, Royal Oak, MI (US); Madhusudan Raghavan, West Bloomfield, MI (US); Damon R. Frisch, Troy, MI (US); Partha P Goswami, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 454 days.

(21) Appl. No.: 12/433,428

(22) Filed: Apr. 30, 2009

(65) Prior Publication Data

US 2010/0280687 A1    Nov. 4, 2010

(51) Int. Cl.
*B60L 9/00* (2006.01)

(52) U.S. Cl. .................. 701/22; 701/105; 701/113

(58) Field of Classification Search .................. 701/22, 701/105, 113
See application file for complete search history.

(56) References Cited

U.S. PATENT DOCUMENTS

| | | | |
|---|---|---|---|
| 6,742,487 B2 * | 6/2004 | Yamaguchi et al. | 123/179.3 |
| 7,021,255 B2 * | 4/2006 | Degner et al. | 123/90.11 |
| 7,267,090 B2 * | 9/2007 | Tamai et al. | 123/179.3 |
| 7,336,002 B2 * | 2/2008 | Kato et al. | 307/10.6 |
| 7,652,448 B2 * | 1/2010 | Palladino | 320/104 |
| 7,821,214 B2 * | 10/2010 | Yaguchi | 318/400.09 |
| 2009/0306842 A1 * | 12/2009 | Oyobe et al. | 701/22 |
| 2010/0006359 A1 * | 1/2010 | Ang et al. | 180/65.285 |
| 2010/0185349 A1 * | 7/2010 | Harada et al. | 701/22 |

* cited by examiner

*Primary Examiner* — Hussein Elchanti
(74) *Attorney, Agent, or Firm* — Quinn Law Group, PLLC

(57) ABSTRACT

A method of controlling a vehicle powertrain and a corresponding vehicle control system are provided that enable operation in an electric-only operating mode for an extended range by adjusting the threshold minimum state of charge of the battery, i.e., the state of charge of the battery at which the engine will be started to allow the battery charge to be replenished, in accordance with vehicle location. The engine will also be started when the vehicle is within a predetermined distance of a long-term parking location.

10 Claims, 4 Drawing Sheets

METHOD OF CONTROLLING VEHICLE POWERTRAIN AND VEHICLE CONTROL SYSTEM

TECHNICAL FIELD

The invention relates to a method of controlling a vehicle powertrain and to a vehicle control system.

BACKGROUND OF THE INVENTION

Modern vehicle powertrains may include two power sources, such as a combustion engine and a motor. The engine utilizes fuel, while the motor utilizes electrical energy stored in a battery, converting the energy to mechanical energy to propel the vehicle. In a parallel hybrid electric powertrain, in addition to the propulsion power available from the motor, the engine is mechanically connected to the wheels for propelling the vehicle. In a powertrain that is commonly referred to as a series hybrid electric powertrain, the engine is operatively connected to the wheels only via the generator and the motor, and there is no direct mechanical connection between the engine and the wheels.

Extended range electric vehicles may be similar to series hybrid electric powertrains, and typically employ a relatively large battery in order to provide sufficient electrical power to power the motor for propelling the vehicle in an electric-only mode for a relatively long driving range. Some electric vehicles and hybrid electric vehicles are configured such that the battery can be recharged by an off-board power source, and are sometimes referred to as plug-in hybrid vehicles, as they may allow recharging by plugging into a power grid at a home or office. These and other types of hybrid vehicles are capable of operating in an electric-only mode from start to finish of many typical driving trips without the engine ever turning on. Such operation increases fuel economy and decreases vehicle emissions, a large percentage of which occur shortly after engine start, when the engine is running at a relatively low temperature. These benefits of operating in electric-only mode must be balanced against the potential for increased battery wear that may occur as the battery state of charge is reduced to a lower level as the range of operation in the electric-only mode is extended.

SUMMARY OF THE INVENTION

A method of controlling a vehicle powertrain and a corresponding vehicle control system are provided that enable operation in an electric-only operating mode for an extended range by adjusting the minimum state of charge of the battery in accordance with vehicle location. The minimum state of battery charge is the state of charge of the battery at which the engine is started to cause the battery charge to be replenished. As used herein a "state of charge" of a battery is the measure of the remaining energy stored in the battery. The state of charge may be measured by direct measurement of properties of the battery, inferred by measurements of voltage, current, and temperature, or by using any other methods. Furthermore, an "electric-only mode" is a mode of operation during which all power is provided by the motor using stored battery power, and the engine is not started.

Specifically, the method may extend the operating range of the electric-only mode by allowing additional battery charge, beyond a predetermined minimum, to be used under certain circumstances. A method of controlling a vehicle powertrain includes monitoring a state of charge of the battery, and determining whether to start the engine during operation in an electric-only operating mode based at least in part on the state of charge of the battery and whether the vehicle is within a predetermined distance of any of a plurality of predetermined locations. The locations are those at which the vehicle is likely to be stopped, with the engine turned off, and which can be reached by using a relatively small amount of additional battery charge. A "predetermined distance" may include both driving distance and a difference in elevation between the vehicle and the respective location. The method may include starting the engine if either the state of charge of the battery is less than a first predetermined state of charge and the vehicle is not within the predetermined distance of any of the locations or the state of charge of the battery is less than a second predetermined state of charge even lower than the first predetermined state of charge Additionally, the method may be used to increase the state of charge of the battery prior to long-term parking, and or events where the vehicle may remain unused and disconnected from the electrical grid for extended periods of time, all of which are referred to herein as "long-term parking events" occurring at "long-term parking locations". Specifically, the predetermined locations may include long-term parking locations, and the method may determine to start the engine if the state of charge of the battery is less than a third (higher) predetermined state of charge and the vehicle is within a predetermined distance of one of the long-term parking locations (either the same or a different predetermined distance as that used for range extension). Thus, if the vehicle is within a predetermined distance of a long-term parking location, the minimum battery state of charge at which the engine is started may be increased, so that the engine will start, causing the generator to increase the state of charge of the battery in anticipation of draining somewhat during the long-term parking event.

A corresponding vehicle control system includes a vehicle powertrain having an engine, a motor, a generator, and a battery. The battery is operatively connected with the motor to power the motor for propelling the vehicle using energy stored in the battery. The engine is connected to the generator for powering the generator, and the generator is connected to the motor and to the battery for providing electric power thereto. A processor is operatively connected to the battery and is configured to determine the state of charge of the battery. A data storage medium is operatively connected to the processor and has a database of information indicative of geographical locations including a first set of geographical locations representing battery charging locations, locations for parking events longer than a predetermined time period, locations for parking events shorter than the predetermined time period, and vehicle destinations. The processor is configured to determine whether a current location of the vehicle is within a predetermined distance of any of the locations in the first set, and start the engine while operating in an electric-only mode if either (i) the state of charge of the battery is less than the first predetermined state of charge and the vehicle is not within the predetermined distance of any of the locations of the first set representing battery charging locations, locations for parking events shorter than the predetermined time period, and vehicle destinations; (ii) the state of charge of the battery is less than a second predetermined state of charge that is less than the first predetermined state of charge; or (iii) the state of charge of the battery is less than a third predetermined state of charge that is greater than the second predetermined state of charge and the vehicle is within the predetermined distance (or a different predetermined distance) of at least one of the locations of the first set representing a location for parking events longer than the predetermined time period.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
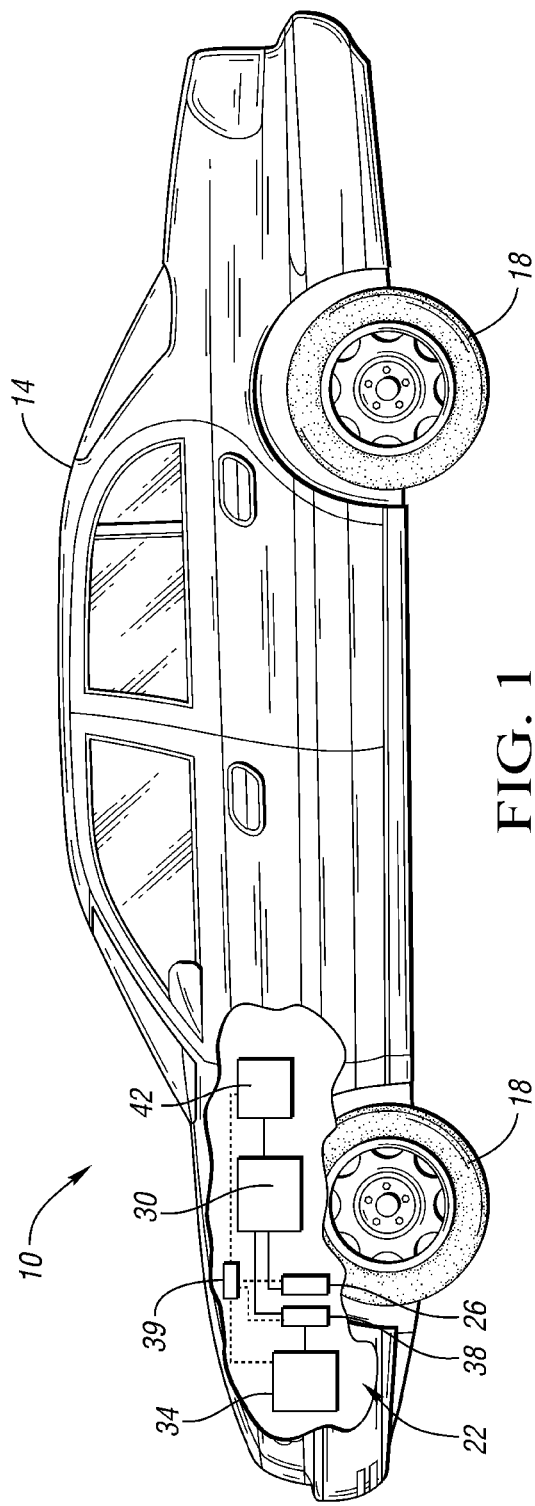
FIG. 1 is a schematic, elevational, partial cutaway view of a vehicle having a powertrain and a navigation system.

Referring to the drawings, wherein like reference numbers refer to like components, FIG. 1 shows an automotive vehicle 10 that includes a vehicle body 14. A plurality of wheels 18 are rotatably mounted with respect to the body 14 and support the body 14 on the ground, as understood by those skilled in the art. The vehicle 10 also includes a powertrain 22. In the embodiment depicted, the powertrain 22 includes an electric motor 26 having a rotor (not shown) operatively connected to at least one of the wheels 18 to transfer torque thereto for propelling the vehicle 10. The powertrain 22 also includes a battery 30 operatively connected to the motor 26 and configured to selectively supply electrical energy to the motor 26. Those skilled in the art will recognize a variety of battery configurations that may be employed within the scope of the claimed invention, such as lead-acid, lithium-ion, nickel-cadmium, nickel-metal hydride, etc. As used herein, a "battery" may include multiple batteries or cells operatively interconnected, e.g., in series or in parallel, to supply electrical energy.

The powertrain 22 in the embodiment depicted further includes an engine 34 and a generator 38. The engine 34 is operatively connected to the generator 38 to drive the generator 38, which causes the generator 38 to generate electrical energy, as understood by those skilled in the art. The generator 38 is operatively connected to the battery 30 to supply electrical energy thereto for recharging the battery 30. The generator 38 is also operatively connected to the motor 26 to selectively supply electrical energy thereto. A powertrain control module 39 controls the flow of electrical energy between the generator 38, the motor 26, and the battery 30, depending on the driver power command, the state of charge of the battery 30, etc.

The powertrain 22 in the embodiment depicted is commonly referred to as a series hybrid-extended range electric powertrain. Other hybrid-electric powertrain configurations, such as parallel hybrid-electric powertrains, may be employed within the scope of the claimed invention. In the embodiment depicted, the powertrain 22 is configured such that the engine 34 operates depending on the state of charge of the battery 30 and a distance of the vehicle 10 from geographical locations represented as data stored in database 54, as discussed below. More specifically, the powertrain 22 is configured to operate using only the energy stored in the battery 30 until the amount of energy in the battery 30 available to propel the vehicle 10 is below a first, a second, or a third predetermined state of charge SOC1, SOC2 or SOC3, depicted in FIG. 3 and further discussed below, at which time the powertrain control module 39 may cause the engine 34 to operate (i.e., starts the engine 34), which in turn causes the generator 38 to recharge the battery 30 and to transmit electrical energy to the motor 26 to propel the vehicle.

In an exemplary embodiment, the powertrain 22 is a plug-in hybrid, extended range electric powertrain, in which the battery 30 is rechargeable by an offboard electrical source (such as the electric grid). The offboard source (not shown) is connectable with a charging port 31 on the battery, which may be a plug, an inductive connection, or other known charge transfer mechanism.

Figure 2:
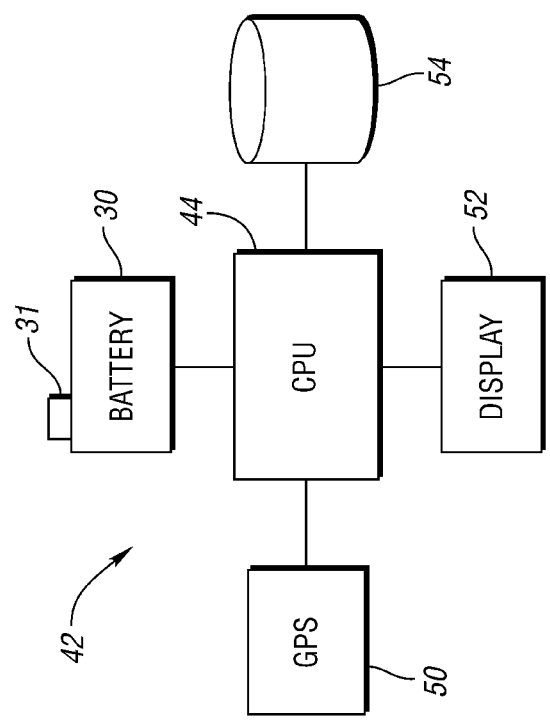
FIG. 2 is a schematic illustration of the navigation system included in the vehicle of FIG. 1.
Figure 4:
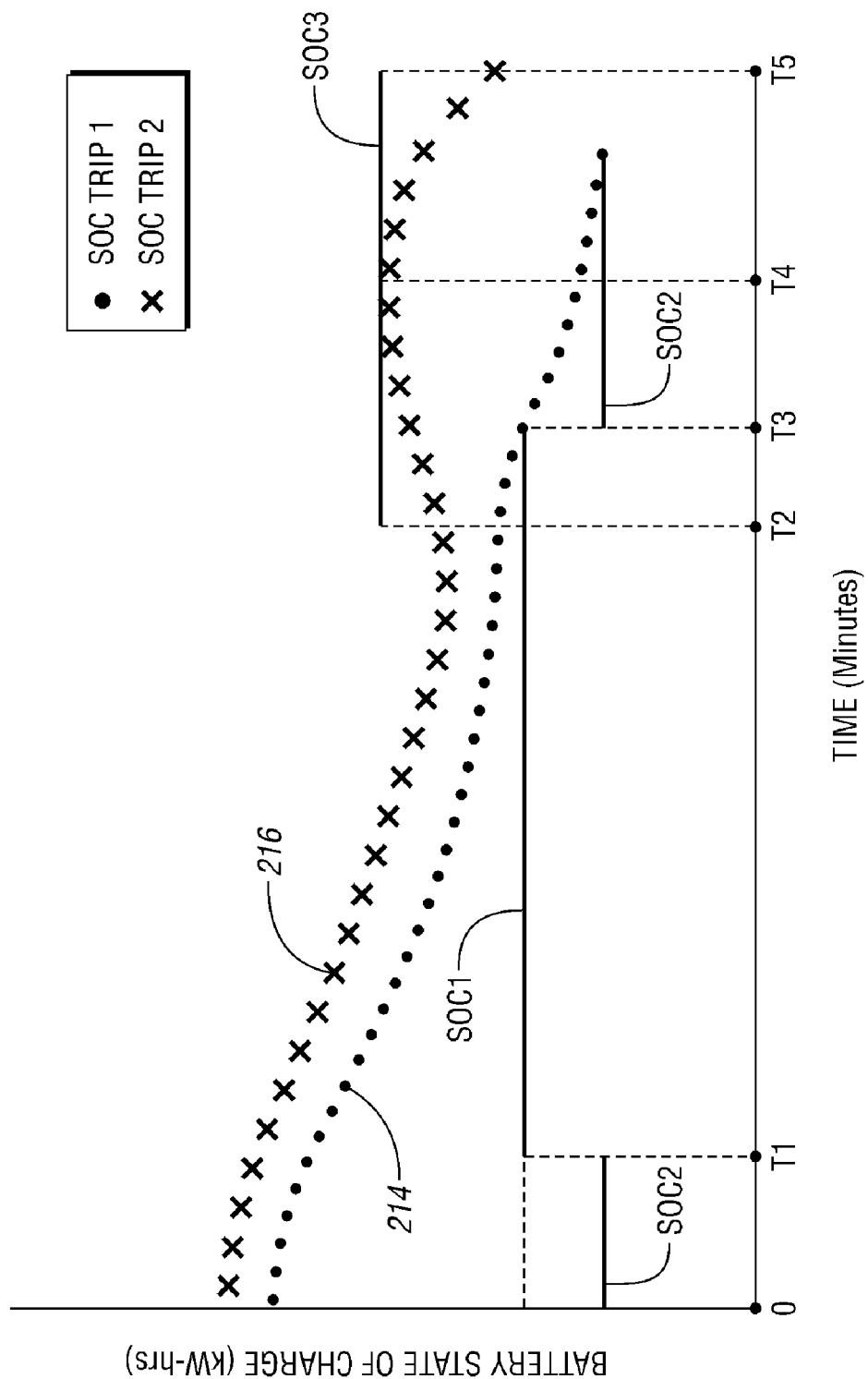
FIG. 4 is a graph illustrating a state of charge of the battery of the vehicle of FIG. 1 during a first and a second trip.

The vehicle 10 also includes a navigation system 42 mounted with respect to the vehicle body 14. Referring to FIG. 2, the navigation system 42 includes a processor 44, a vehicle location detection device which, in the embodiment depicted, is a global positioning system (GPS) receiver 50, a touch-screen display 52, and a data storage medium 54. Information representing a surrounding area and a set of vehicle locations therein, i.e., a map database, illustrated in FIG. 4, is stored in the data storage medium 54 and may be illustrated relative to the location of the vehicle 10 on the display 52. Alternatively, the global positioning coordinates of the set of locations alone, without the remaining map information, such as roads, may be stored in the data storage medium. In such an embodiment, the data would be transferred to the data storage medium via the GPS 50 and the processor 44, and no display 52 would be provided. Global positioning coordinates include elevation information.

Figure 5:
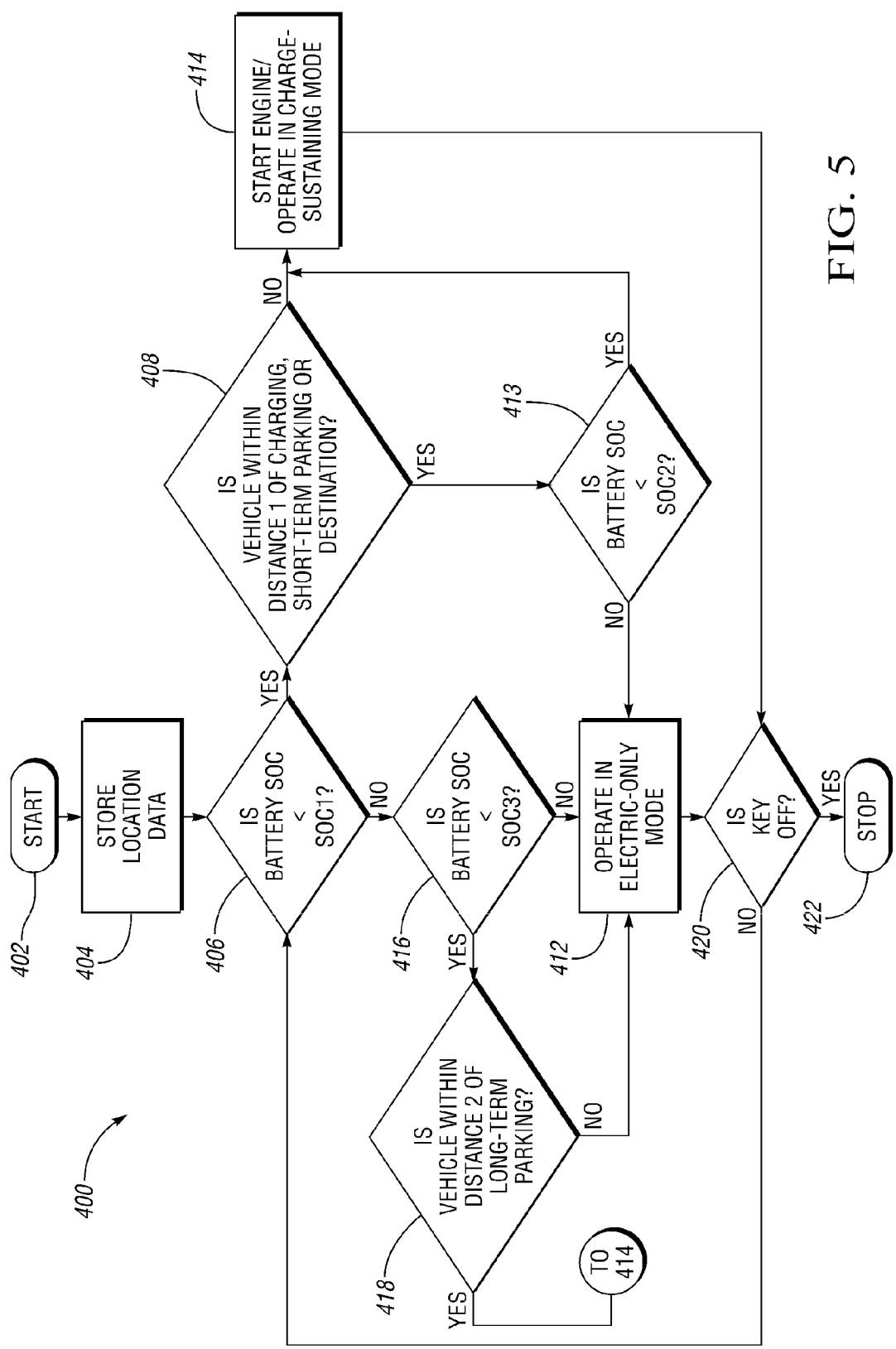
FIG. 5 is flow chart illustrating a method of controlling the powertrain of the vehicle of FIG. 1.

The processor 42 is further operatively connected with a powertrain control module 39 and sends electrical signals to the control module 39 instructing the control module 39 to start the engine 34 when the processor 44 carries out the method 400 of controlling the powertrain 22, described with respect to FIG. 5, with the result of starting the engine 34 (i.e., operating in a charge sustaining mode).

Figure 3:
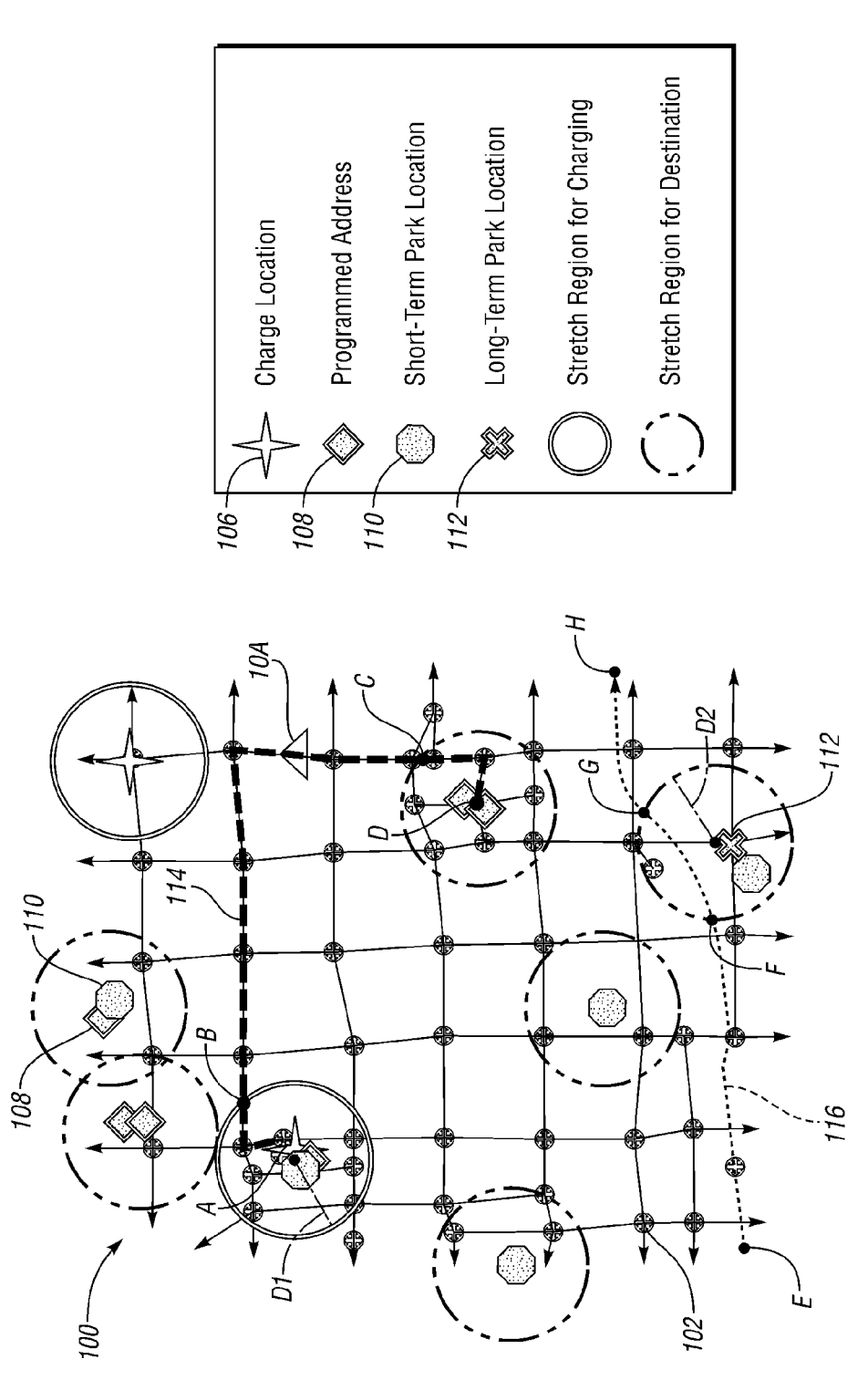
FIG. 3 is a portion of a map showing various vehicle locations stored in a database.

FIG. 3 schematically depicts a geographical area 100 surrounding the vehicle 10, including a plurality of global positioning coordinates 102 that are used to partition the area into driving regions 104. Various potential or previous vehicle locations as stored by representative data in the database 54 include charge locations 106 represented in FIG. 3 by a starlike shape, programmed addresses 108, represented by a diamond shape, short-term parking locations 110, represented by an octagonal stop sign shape, long-term park locations 112 represented by an X shape. Programmed addresses 108 may be previous destinations of the vehicle 10 or potential destinations. Subregions (also referred to as stretch regions) indicating the area within a predetermined distance D1 (or distances) of the various locations are indicated with a solid circle (subregions surrounding charging locations 106) or a dashed circle (subregions surrounding programmed addressees 108, and parking locations 110, 112). It is noted that the subregions surrounding the long-term parking locations 112 cover an area within a larger predetermined distance D2 from the long-term parking location 112, than the short-term parking locations 110). Alternatively, D2 may be equal to D1.

The information depicted in the area 100 is stored in the database 54 and may be displayed as a map on the display screen 52, or, if the vehicle 10 is alternatively equipped with only a GPS 50 and processor 44, the information is stored in the database 54 as geographical coordinates determined by the GPS 50. That is, in embodiments that have a GPS 50 but not a display 52 or a map database stored in the database 54, the global positioning coordinates corresponding with the locations 106, 108, 110, 112 have been stored in the database 54 as the vehicle 10 is located at such locations during previous vehicle trips. Additionally, the method 400 may direct the GPS 50 to determine the position of the vehicle at key-on, before beginning a trip, so that the processor 44 can then calculate the distance between the vehicle and previously stored locations. With a navigation system 42 that includes a map database stored in the database 54, even locations where the vehicle has never physically been located (i.e., potential but not previous locations) are included in the map database.

The vehicle 10 is depicted in the area 100 at a current vehicle location 10A as it travels along a trip route 114 indicated with heavy dashes. An alternate trip route 116 is shown with shorter dashes. The state of charge of the battery 30 as the vehicle 10 proceeds along Trip 1 with trip route 114 or along Trip 2 with trip route 116 is indicated as curves 214 and 216 in the plot of FIG. 4, and results from the processor 44 and controller 39 controlling the powertrain 22 according to the method 400 of FIG. 5. The method 400 determines whether to start the engine 34 while operating in an electric-only mode based on predetermined minimum states of charge in the battery (i.e., charge thresholds) in conjunction with the vicinity of the vehicle 10 to the various locations 106, 108, 110, 112 of FIG. 3.

Referring to FIG. 5, the method 400 controls the powertrain 22 to extend the distance the vehicle 10 is driven in an electric-only mode, without the engine 34 starting, under certain circumstances. Specifically, when the battery state of charge reaches a predetermined minimum level SOC1 (shown in FIG. 4) at which the processor 44 would normally start the engine 34 so that the battery charge can be replenished by the generator 38, if the processor determines that the vehicle 10 is within the vicinity of certain locations making it likely that the vehicle 10 will be turned off shortly, the processor 44 will extend the electric-only mode to prevent an engine start during the trip.

The method 400 will be described with respect to the vehicle 10 moving along trip route 114 in Trip 1 of FIG. 3 with the resulting battery state of charge 214 of FIG. 4. The method starts at block 402 and proceeds to block 404, during which location data 106, 108, 110, 112 is stored in the database 54. As discussed above, the location data 106, 108, 110, 112 may represent only previous vehicle locations, as indicated by the GPS 50, in which case block 404 is carried out prior to the start of Trip 1. If the vehicle has a navigation system 42 that includes the stored map database, then block 404 is carried out prior to trip 114 when the map database is stored in database 54. The system 42 may also be capable of storing previous vehicle locations along with locations indicated in the map database, so that location data 106, 108, 110, 112 represents locations both learned (by previous actual locations of the vehicle 10) and inferred (from the map database). At the start of the trip, the GPS 50 determines the initial location of vehicle 10, and the processor 44 can then determine the relative positions of the stored locations.

As the vehicle 10 travels, the state of charge of the battery 30 is monitored in block 406 to determine whether the battery state of charge is less than a predetermined first state of charge, shown as SOC1 in FIG. 4. Because the vehicle 10 is within the predetermined distance D of the locations 106, 108 and 110, at the start of Trip 1, when traveling from starting point A to point B (see FIG. 3), which corresponds with time period 0 to T1 in the plot of FIG. 4, the processor 44 will set the state of charge threshold for starting the engine 34 at a lower second predetermined state of charge SOC2, for reasons discussed below. In the particular exemplary circumstances of Trip 1, the battery 30 has a much higher state of charge than either SOC1 or SOC2, as shown in FIG. 4. As the vehicle travels during time period T1 to T3, the battery SOC is not less than the predetermined first state of charge SOC1, so the method 400 proceeds from block 406 to block 416, in which the processor 44 determines whether the battery SOC is less than a third predetermined state of charge SOC3. The third predetermined state of charge SOC3 is greater than both the first predetermined state of charge SOC1 and the second predetermined state of charge SOC2. Until approximately midway between time T1 and time T3, the battery state of charge, represented by the plot of curve 214, is greater than SOC3, so the method 400 proceeds from block 416 to block 418. In block 418, the method 400 determines whether the vehicle 10 is within a second predetermined distance D2 (see FIG. 3) of a long-term parking location 112. Because, as is evident in FIG. 3, the vehicle never moves within such a distance of a long-term parking location 112 during the trip 114, the method 400 proceeds to block 412, and continues operation of the vehicle 10 in an electric-only mode (i.e., does not start engine 34). The method 400 then proceeds to block 420 and checks to determine whether the key is off (i.e., whether the trip is over), and if the key is not off, resumes at block 406. If the key is off, the method 400 ends at block 422.

Assuming the key is not off, the method 400 will proceed through blocks 406, 416, 418, 412 and 420 until time T3, when the state of charge of the battery 30 is less than the first predetermined state of charge SOC1. At that point, the method 400 proceeds from block 406 to block 408 in which a determination is made as to whether the vehicle 10 is within distance D1 of a charging location 106, a short-term parking location 110 or a destination such as a programmed address 108. In the exemplary trip route 114 of FIG. 3, the vehicle 10 will be within distance D1 of programmed address 108 after the vehicle 10 has passed point C. Accordingly, the method 400 will move from block 408 to block 413, and determine whether the state of charge of the battery 30 is less than the second predetermined state of charge SOC2. If not, then the engine 34 is not started, and the powertrain 22 is controlled to continue operating in electric-only mode. Thus, because the vehicle 10 is near a likely end of Trip 1 (i.e., is within a predetermined distance D1 of locations 106, 108, 110), the battery 30 is allowed to drain to the lowered state of charge SOC2 in an effort to prevent an engine start. However, if the battery state of charge is less than the second predetermined state of charge SOC2, then the method 400 moves from block 413 to block 414, and the engine 34 is started so that the generator 38 can add energy to the battery 30. Because Trip 1 ends just before the battery SOC reaches the second predetermined state of charge SOC2, the engine 34 is not started during Trip 1. Thus, the electric driving range of vehicle 10 has been extended by lowering the engine start threshold (i.e. the battery state of charge at which the engine will be started) from the first predetermined state of charge SOC1 to the second predetermined state of charge SOC2.

Applying the method 400 to the control the powertrain 22 as the vehicle 10 moves along trip route 116 of FIG. 3, with corresponding battery state of charge represented by curve 216 of FIG. 4, as the vehicle 10 moves between points E and F, the battery state of charge SOC remains above the first predetermined state of charge SOC1 and the vehicle 10 does not come within the predetermined distance D2 of any long-term parking locations 112, so the method proceeds in order from block 402, 404, 406, 416, 418, 412, 420 and back to 406, or from block 406, 416, 412, 420, 422.

Between points F and G on trip route 116, corresponding with time T2 to time T4, the vehicle 10 is within the predetermined distance D2 of long-term parking location 112, so the method 400 will move from block 416 to block 418, then to block 414, and the engine 34 will be started. The method 400 is anticipating that the vehicle 10 will be parked at location 112, and therefore raises the state of charge of the battery before parking, as long-term parking is associated with a greater anticipated battery charge drain. However, according to trip route 116, the vehicle 10 does not in fact move to the long-term parking location 112, and instead moves from point G to point H, where Trip 2 ends. Between points G and H, corresponding with time T4 to time T5, the method will thus answer the query of block 416 in the negative, and the vehicle will operate in electric-only mode from point G to point H, causing the decrease in battery state of charge evident on curve 216 between time T4 and time T5.

Thus, the vehicle 10 with processor 44 and controller 39 is configured to carry out method 400 to prevent engine starts during trips, under conditions that would otherwise warrant starting the engine, when the vehicle 10 is in the vicinity of locations at which it is likely to be shut off after traveling just an additional short distance for an additional short time period. The fuel economy and other benefits of not starting the engine 34 during such trips is considered to outweigh the potential battery wear due to drawing the battery down to a relatively lower state of charge. Furthermore, the method 400 allows the battery 30 to be charged to a sufficient level (predetermined state of charge SOC3) if a long-term parking event is likely to occur within a short time period, thus indicating that the disadvantages associated with starting the engine 34 are outweighed by the ability to have a more fully charged battery 30 prior to a long-term parking event.

While the best modes for carrying out the invention have been described in detail, those familiar with the art to which this invention relates will recognize various alternative designs and embodiments for practicing the invention within the scope of the appended claims.

The invention claimed is:

1. A method of controlling a powertrain of a vehicle having an engine, a motor, and a battery; wherein the battery is operatively connected with the motor to power the motor for propelling the vehicle using energy stored in the battery; the method comprising:
   monitoring a state of charge of the battery;
   determining whether to turn the engine on during operation in an electric-only operating mode based at least in part on the state of charge of the battery and whether the vehicle is within different predetermined distances of different locations, each of said different locations being one of different categories of locations; wherein one of said categories of locations is charging locations and another of said categories of locations is parking locations associated with parking for greater than a predetermined period of time without charging;
   starting the engine if the state of charge of the battery is less than a first predetermined state of charge and the vehicle is not within a first predetermined distance of one of the charging locations;
   starting the engine if the state of charge of the battery is less than a second predetermined state of charge that is less than the first predetermined state of charge; and
   starting the engine if the state of charge of the battery is less than a third predetermined state of charge that is greater than the first predetermined state of charge and the vehicle is within a second predetermined distance of one of the parking locations.

2. The method of claim 1, wherein the different locations are previous locations of the vehicle.

3. The method of claim 1, wherein data representing the locations is stored in a map database; and wherein the locations are selected based on information other than previous locations of the vehicle.

4. A method of controlling a powertrain of a vehicle having an engine, a motor, and a battery; wherein the battery is operatively connected with the motor to power the motor for propelling the vehicle using energy stored in the battery; the method comprising:
   determining whether a state of charge of the battery is less than a first predetermined state of charge while operating in an electric-only mode;
   determining whether the vehicle is within a first predetermined distance of a first location; wherein the first location is categorized in a stored map database as a charging location, a location for parking events lasting less than a predetermined time period, or a vehicle destination, based on information other than previous locations of the vehicle;
   determining whether the vehicle is within a second predetermined distance of a second location; wherein the second predetermined location is categorized in a stored map database as a potential location at which the vehicle may be parked for more than the predetermined time period without charging based on information other than previous parking of the vehicle at the second predetermined location; and
   starting the engine if the state of charge of the battery is less than the first predetermined state of charge and the vehicle is not within the predetermined distance of the first location;
   starting the engine if the state of charge of the battery is less than a second predetermined state of charge that is less than the first predetermined state of charge; and
   starting the engine if the state of charge of the battery is less than a third predetermined state of charge that is greater than the first predetermined state of charge and the vehicle is within the second predetermined distance of the second location.

5. The method of claim 4, further comprising:
   storing in the map database data indicative of locations of the vehicle during battery charging events, during parking events lasting less than the predetermined time period, and of vehicle destinations.

6. The method of claim 4, further comprising:
   storing in the map database data indicative of locations of the vehicle during parking events lasting longer than the predetermined time period; wherein the second location is one of the locations stored as data indicative of locations of the vehicle during parking events lasting longer than the predetermined time period.

7. The method of claim 4, wherein the first predetermined distance is a fraction of a predetermined electric-only driving range determined based on a fully charged state of the battery.

8. A vehicle control system comprising:
   a vehicle powertrain having an engine, a motor, a generator, and a battery; wherein the battery is operatively connected with the motor to power the motor for propelling the vehicle using energy stored in the battery; wherein the engine is connected to the generator for powering the generator, and the generator is connected to the motor and to the battery for providing electric power thereto;
   a processor operatively connected to the battery and configured to determine the state of charge of the battery;
   a data storage medium having a database indicative of geographical locations including a first set of geographical locations representing battery charging locations, locations for parking events longer than a predetermined time period without battery charging, locations for parking events shorter than the predetermined time period without battery charging, and vehicle destinations; and wherein the processor is configured to:

determine distances between a current location of the vehicle and the locations in the first set;

start the engine while operating in an electric-only mode:

when the state of charge of the battery is less than the first predetermined state of charge and the vehicle is not within a first predetermined distance of any of the locations of the first set representing battery charging locations, locations for parking events shorter than the predetermined time period without battery charging, and vehicle destinations;

when the state of charge of the battery is less than a second predetermined state of charge that is less than the first predetermined state of charge; and when the state of charge of the battery is less than a third predetermined state of charge that is greater than the second predetermined state of charge and the vehicle is within a second predetermined distance of at least one of the locations of the first set representing a location for parking events longer than the predetermined time period without battery charging.

9. The system of claim 8, wherein the processor and the data storage medium are included in a navigation system that further includes a map database describing the first set of locations, and a display screen configured to display the current location of the vehicle.

10. The system of claim 8, wherein the battery is configured to be recharged by an offboard electrical source.

* * * * *